(12) United States Patent
Yao et al.

(10) Patent No.: US 7,821,743 B2
(45) Date of Patent: Oct. 26, 2010

(54) MICRO-ACTUATOR FOR USE IN SMALL PLATFORM DISK DRIVE DEVICES, AND METHOD OF MAKING THE SAME

(75) Inventors: MingGao Yao, Dongguan (CN); YiRu Xie, Dongguan (CN); Lin Guo, Dongguan (CN); Yu Sun, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 831 days.

(21) Appl. No.: 11/648,578

(22) Filed: Jan. 3, 2007

(65) Prior Publication Data

US 2008/0158734 A1 Jul. 3, 2008

(51) Int. Cl.
*G11B 5/55* (2006.01)

(52) U.S. Cl. .................................. 360/294.4
(58) Field of Classification Search .............. 360/294.1, 360/294.2, 294.4
See application file for complete search history.

(56) References Cited

U.S. PATENT DOCUMENTS

| | | | |
|---|---|---|---|
| 6,671,131 B2 | 12/2003 | Kasajima et al. | |
| 6,700,749 B2 | 3/2004 | Shiraishi et al. | |
| 7,099,115 B2 * | 8/2006 | Yao et al. ................ | 360/244.7 |
| 7,612,968 B1 * | 11/2009 | Guo et al. ................ | 360/294.4 |
| 2003/0168935 A1 | 9/2003 | Ogawa et al. | |
| 2005/0207068 A1 * | 9/2005 | Yao et al. ................ | 360/294.3 |
| 2006/0098347 A1 * | 5/2006 | Yao et al. ................ | 360/294.4 |
| 2007/0064347 A1 * | 3/2007 | Honda .................... | 360/294.4 |
| 2007/0097553 A1 * | 5/2007 | Yao ........................ | 360/294.4 |
| 2007/0153428 A1 * | 7/2007 | Yao et al. ................ | 360/294.4 |
| 2007/0188931 A1 * | 8/2007 | Yao ........................ | 360/294.4 |
| 2008/0024933 A1 * | 1/2008 | Yao et al. ................ | 360/294.4 |
| 2008/0106823 A1 * | 5/2008 | Yao ........................ | 360/294.4 |

FOREIGN PATENT DOCUMENTS

JP 2002-133803 5/2002

* cited by examiner

*Primary Examiner*—Angel A. Castro
(74) *Attorney, Agent, or Firm*—Nixon & Vanderhye P.C.

(57) ABSTRACT

A micro-actuator for use with an HGA and/or disk drive device (e.g., a small platform disk drive device) with the micro-actuator having a reduced mass suitable for improving shock performance, and/or methods of making the same are provided. In certain example embodiments, the micro-actuator may comprise a substantially U-shaped frame including a cavity capable of receiving a slider, with the frame including two side arms and a bottom support arm at least partially defining the cavity. The bottom support arm may have a reduced mass capable of providing improved shock performance and capable of conveying a high resonance frequency response at a low gain. The bottom support arm may be, for example, substantially rectangle shaped, substantially I-shaped, toothed, etc. Also, the bottom support arm may be less thick than the side arms.

17 Claims, 10 Drawing Sheets

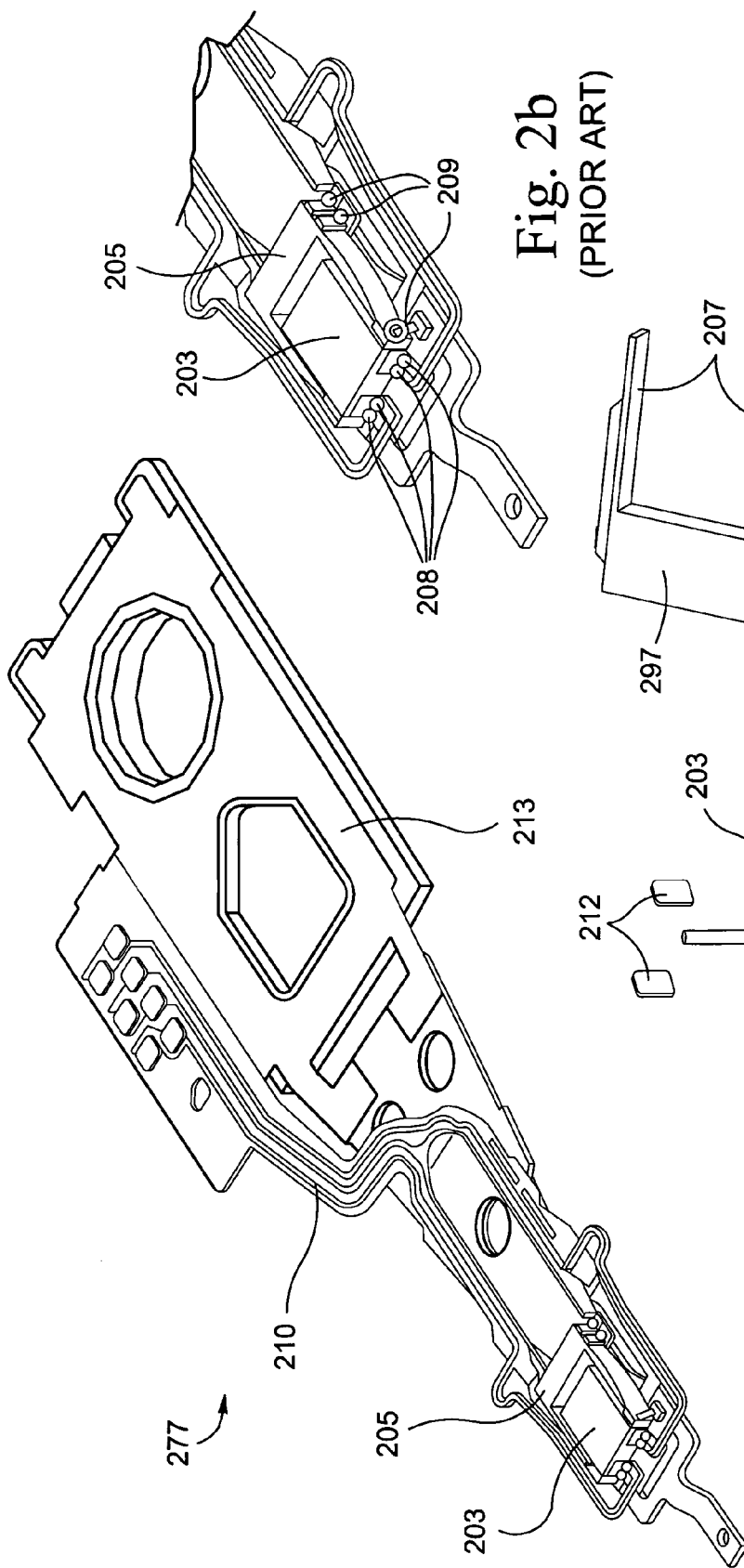
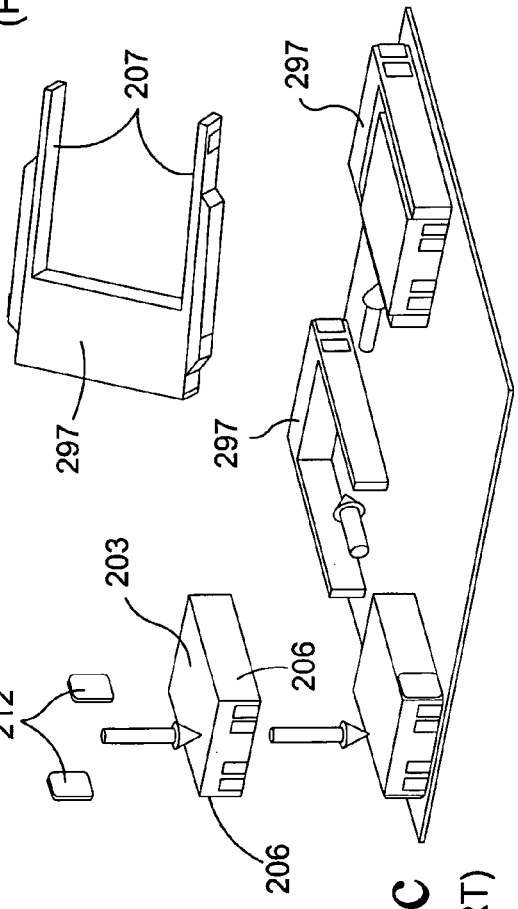
Fig. 2a (PRIOR ART)
Fig. 2b (PRIOR ART)
Fig. 2c (PRIOR ART)

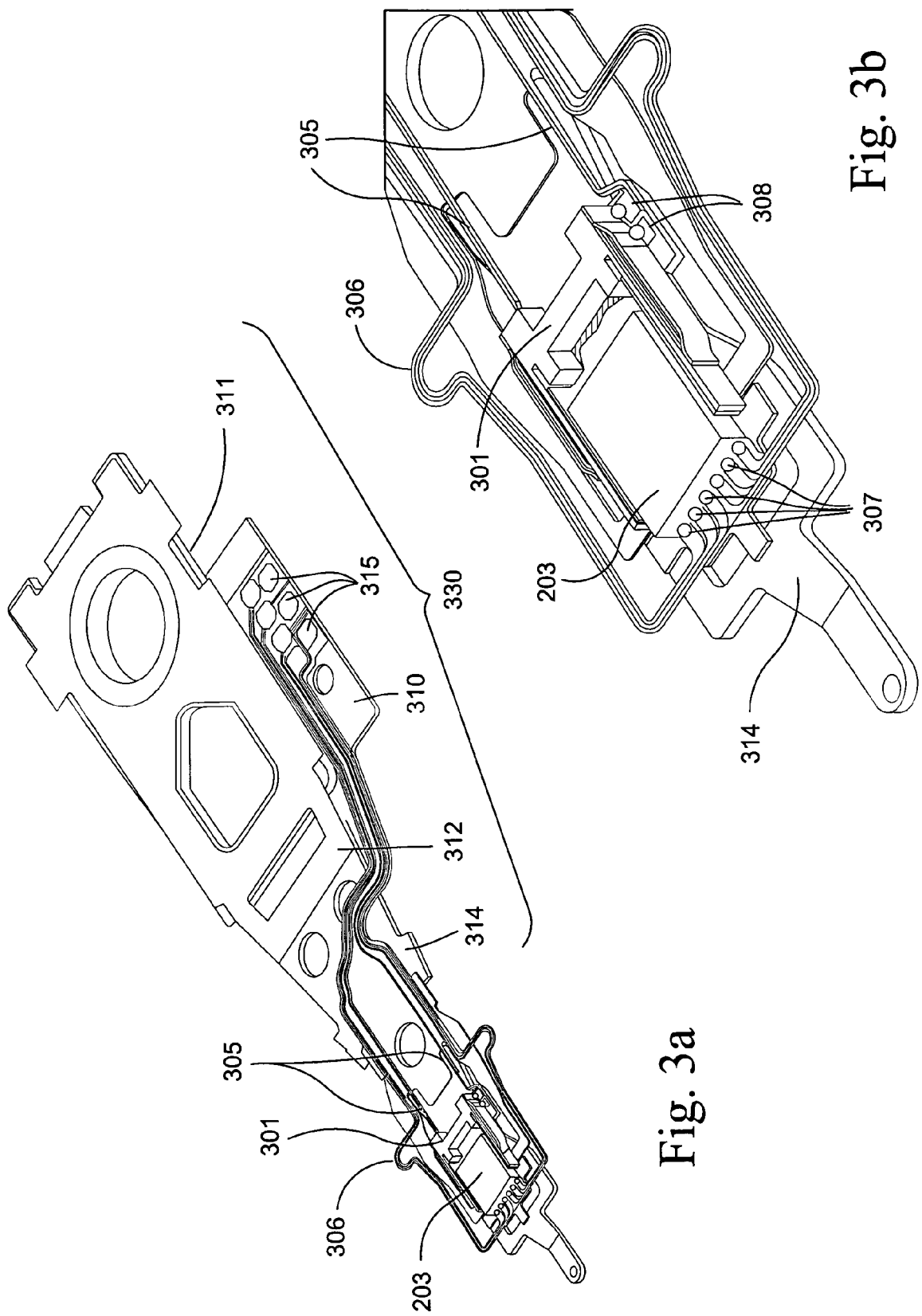

| Type | Head | 3 Inch Height | | | | 4 Inch Height | | | | 5 Inch (90°) Height | | | |
|---|---|---|---|---|---|---|---|---|---|---|---|---|---|
| | | Connector | | No Connector | | Connector | | No Connector | | Connector | | No Connector | |
| | | Up | Dn | Up | Dn | Up | Dn | Up | Dn | Up | Dn | Up | Dn |
| Current Techniques | 1 | o | o | o | o | x | o | o | o | x | o | x | x |
| | 2 | o | o | o | o | o | o | x | o | o | o | o | x |
| | 3 | o | o | o | o | x | o | o | x | x | x | o | x |
| | 4 | o | o | o | o | o | o | x | o | o | o | o | x |
| | 5 | o | o | o | o | o | x | o | x | o | x | x | x |
| | 6 | o | o | o | o | x | x | x | o | x | x | x | x |
| | 7 | o | o | o | o | o | o | o | x | x | x | x | x |
| | 8 | o | o | o | o | x | o | o | o | x | x | x | x |
| | 9 | o | o | o | o | o | o | o | o | x | o | x | o |
| | 10 | o | o | o | o | o | o | o | x | x | o | o | o |
| Certain Example Embodiments | 1 | o | o | o | o | o | o | o | o | o | o | o | o |
| | 2 | o | o | o | o | o | o | o | o | o | o | o | o |
| | 3 | o | o | o | o | o | o | o | o | o | o | o | o |
| | 4 | o | o | o | o | o | o | o | o | o | o | o | o |
| | 5 | o | o | o | o | o | o | o | o | o | o | o | o |
| | 6 | o | o | o | o | o | o | o | o | o | o | o | o |
| | 7 | o | o | o | o | o | o | o | o | o | o | o | o |
| | 8 | o | o | o | o | o | o | o | o | o | o | o | o |
| | 9 | o | o | o | o | o | o | o | o | o | o | o | o |
| | 10 | o | o | o | o | o | o | o | o | o | o | o | o |

Fig. 6

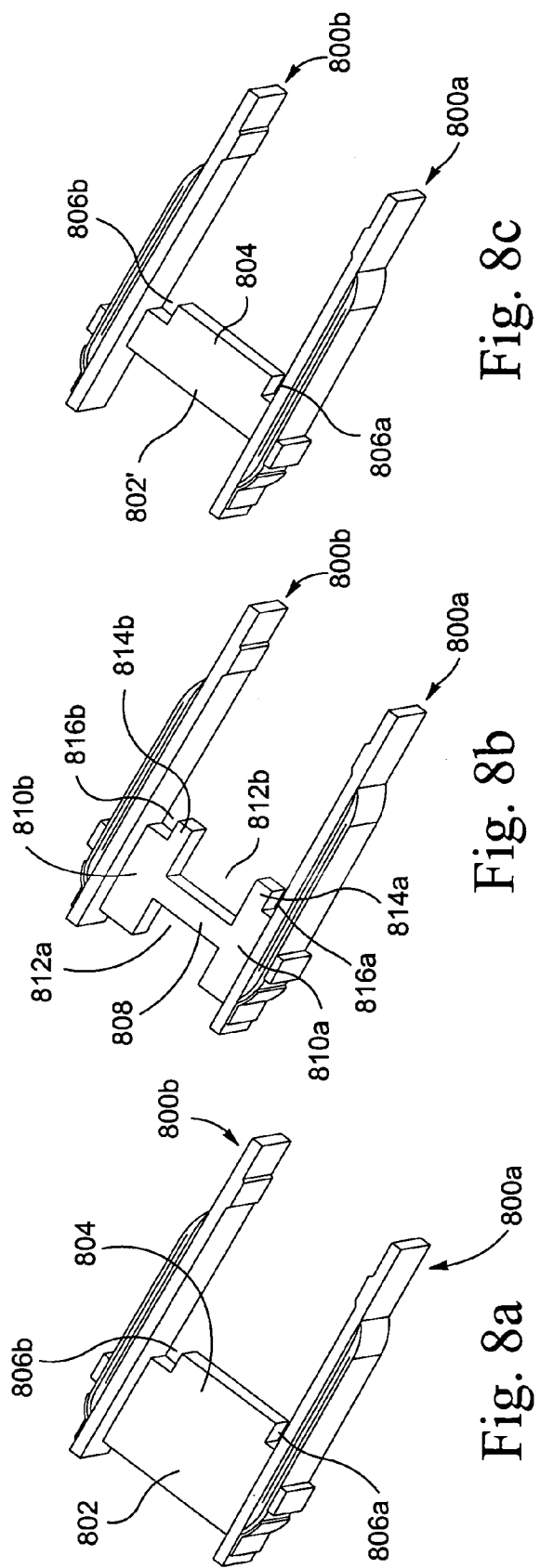
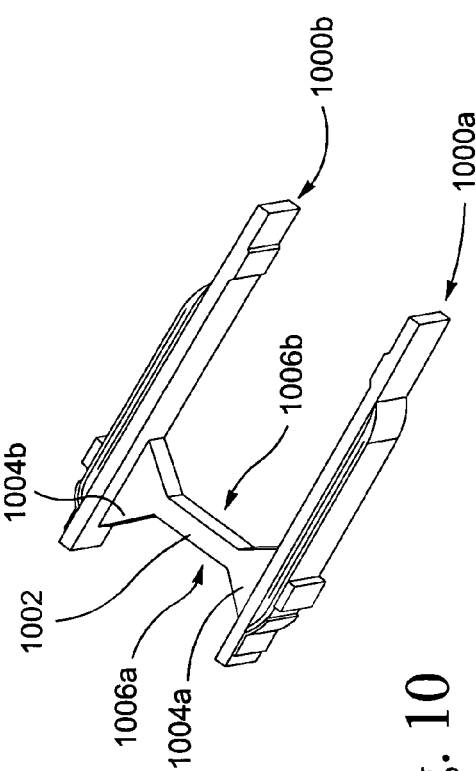
Fig. 8a   Fig. 8b   Fig. 8c   Fig. 10

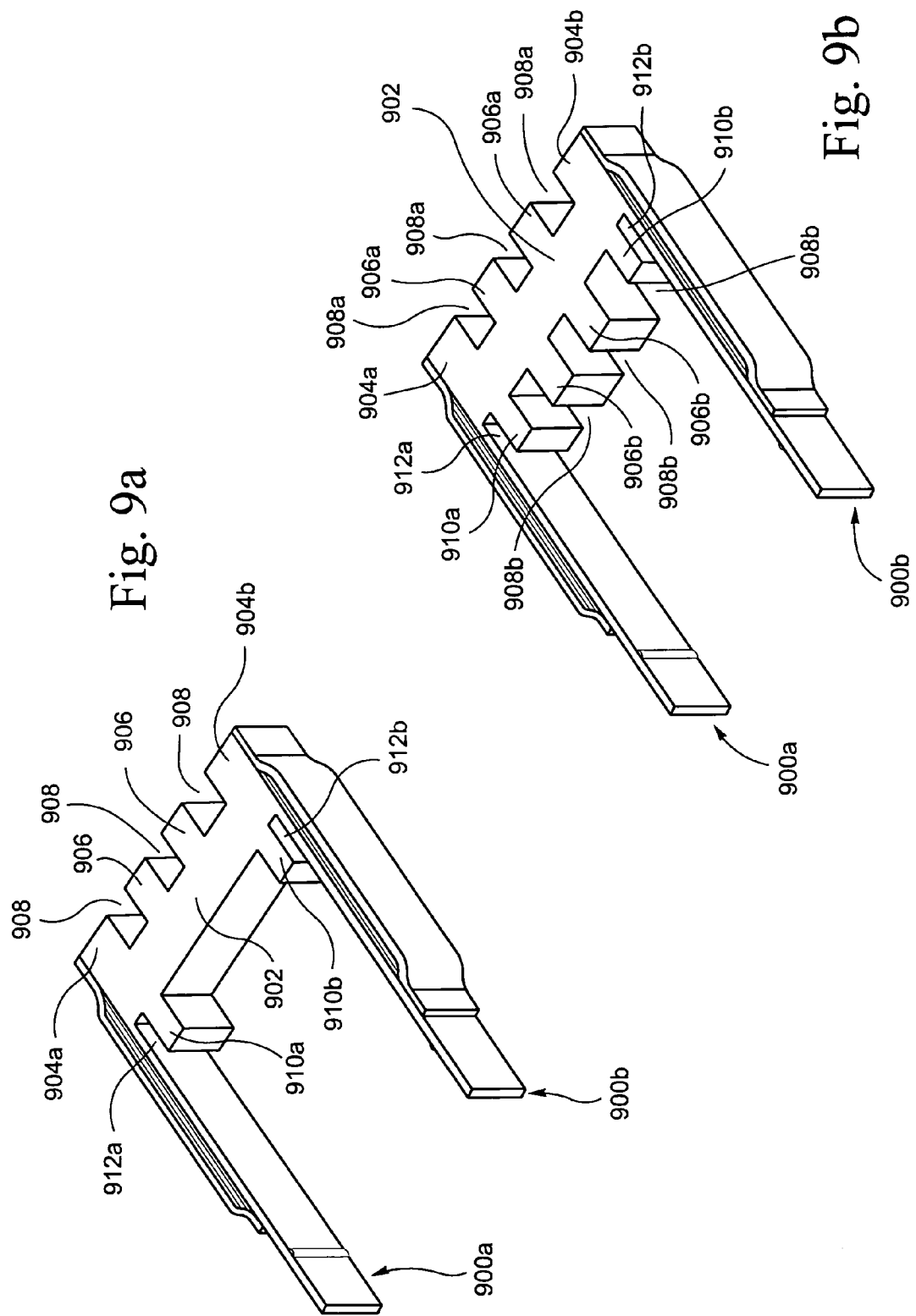

MICRO-ACTUATOR FOR USE IN SMALL PLATFORM DISK DRIVE DEVICES, AND METHOD OF MAKING THE SAME

FIELD OF THE INVENTION

The example embodiments herein relate to information recording disk drive devices and, more particularly, to a micro-actuator for use with an HGA and/or disk drive device (e.g., a small platform disk drive device) with the micro-actuator having a reduced mass suitable for improving shock performance, and/or methods of making the same.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate micro-actuators are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion and/or contraction thereof. The PZT micro-actuator is configured such that expansion and/or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803; U.S. Pat. Nos. 6,671,131 and 6,700,749; and U.S. Publication No. 2003/0168935, the contents of each of which are incorporated herein by reference.

FIG. 1 illustrates a conventional disk drive unit and shows a magnetic disk 101 mounted on a spindle motor 102 for spinning the disk 101. A voice coil motor arm 104 carries a head gimbal assembly (HGA) that includes a micro-actuator with a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101.

Because of the inherent tolerances (e.g., dynamic play) of the VCM and the head suspension assembly, the slider cannot achieve quick and fine position control, which adversely impacts the ability of the read/write head to accurately read data from and write data to the disk when only a servo motor system is used. As a result, a PZT micro-actuator, as described above, is provided in order to improve the positional control of the slider 103 and the read/write head. More particularly, the PZT micro-actuator corrects the displacement of the slider on a much smaller scale, as compared to the VCM, in order to compensate for the resonance tolerance of the VCM and/or head suspension assembly. The micro-actuator enables, for example, the use of a smaller recording track pitch, and can increase the "tracks-per-inch" (TPI) value for the disk drive unit, as well as provide an advantageous reduction in the head seeking and settling time. Thus, the PZT micro-actuator enables the disk drive device to have a significant increase in the surface recording density of the information storage disks used therein.

FIG. 2a is a partial perspective view of an HGA 277 having a conventionally designed micro-actuator, FIG. 2b is a partial perspective view of the tongue region of the HGA of FIG. 2a, and FIG. 2c illustrates how a slider and micro-actuator conventionally are mounted to each other. With respect to FIGS. 2a-c, a conventional PZT micro-actuator 205 comprises a ceramic U-shaped frame 297. The frame 297 comprises two ceramic beams 207, each of which has a PZT element (not labeled) mounted thereon for actuation. The PZT micro-actuator 205 is operably coupled to a suspension 213, and there are multiple (e.g., three) electrical connection balls 209 (formed by, for example, gold ball bonding (GBB) or solder ball bonding (SBB)) to operably couple the micro-actuator 205 to the suspension traces 210 on one side of each of ceramic beam 207. In addition, there are multiple (e.g., four) metal balls 208 (formed by, for example, GBB or SBB) to operably couple the slider 203 to the suspension traces 210 for connection with read/write transducers (not shown). The micro-actuator 205 is mounted to the suspension tongue by the bottom arm of the frame 297, and the slider 203 is at least partially mounted between the two side arms 207 of the micro-actuator 205.

The slider 203 is connected (e.g. bonded using epoxy dots 212) to the two ceramic beams 207 at points 206 proximate to the opening of the U-shaped frame. The frame 297 is shaped like a hollow rectangular structure for receiving the slider 203. The bottom of the frame 297 is attached to the suspension tongue region of the suspension. The slider 203 and the beams 207 are not directly connected to the suspension and thus may move freely with respect to the suspension.

When an actuating power is applied through the suspension traces 210, the PZT pieces on the ceramic beams 207 will expand and/or contract, causing the two ceramic beams 207 to bend in a common lateral direction. The bending causes a shear deformation of the frame 297, whereby its shape resembles a parallelogram. The slider 203 undergoes a lateral translation, because it is attached to the moving side(s) of the parallelogram. Thus, a fine head position adjustment can be attained.

While these structures traditionally have been suitable for large (e.g., 3.5") HDDs, several improvements still could be made. For example, 3.5" HDDs typically have large platforms, and this arrangement generally helps to provide shock performance by maintaining sufficiently large margins. However, especially in the case of smaller HDDs (e.g., HDDs less than 3.5" including, for example, 2.5", 1.8", and smaller platform HDDs), the large mass of the micro-actuator will negatively affect shock performance. Additionally, regardless of size, increased mass may negatively impact the resonance characteristics (relating to, for example, resonance frequencies, resonance gains, etc.), whereas reduced masses may provide improved resonance characteristics.

Thus it will be appreciated that there is a need in the art for an improved micro-actuator, HGA, and disk drive device, and methods of making the same.

SUMMARY OF THE INVENTION

One aspect of certain example embodiments described herein relates to a substantially U-shaped micro-actuator frame having a reduced mass.

Another aspect relates to better shock performance for small- and/or large-platform disk drive devices.

Still another aspect relates to improved HGA dynamic performance including, for example, better resonance performance. More particularly, certain example embodiments having reduced masses may operate at higher resonance frequencies and lower resonance gains.

According to certain example embodiments, a micro-actuator is provided. A substantially U-shaped frame may include a cavity capable of receiving a slider. The frame may include two side arms and a bottom support arm at least partially defining the cavity. Each side arm may have a PZT element mounted on an outer surface thereof facing away from the cavity. The bottom support arm may have a reduced mass capable of providing improved shock performance and capable of conveying a high resonance frequency response at a low gain.

According to certain other example embodiments, a head gimbal assembly is provided. A suspension may be configured to support on a tongue region thereof a micro-actuator and a slider. The suspension may comprise a load beam supporting a base plate and a hinge. The micro-actuator may comprise a substantially U-shaped frame including a cavity capable of receiving a slider. The frame may include two side arms and a bottom support arm at least partially defining the cavity. Each side arm may have a PZT element mounted on an outer surface thereof facing away from the cavity. The bottom support arm may have a reduced mass capable of providing improved shock performance and capable of conveying a high resonance frequency response at a low gain.

According to still other example embodiments, a disk drive device is provided. A head gimbal assembly may carry a micro-actuator and a slider. A drive arm may be connected to the head gimbal assembly. A spindle motor may be operable to spin a disk. The micro-actuator may comprise a substantially U-shaped frame including a cavity capable of receiving a slider. The frame may include two side arms and a bottom support arm at least partially defining the cavity. Each side arm may have a PZT element mounted on an outer surface thereof facing away from the cavity. The bottom support arm may have a reduced mass capable of providing improved shock performance and capable of conveying a high resonance frequency response at a low gain.

Certain example embodiments provide a method of making a micro-actuator. Two side portions may be connected around a center support portion and a PZT element may be connected to an outer side of each side portion to form a large structure. The large structure may be exposed to high-temperature firing. The large structure may be cut into at least one micro-actuator. The at least one micro-actuator may comprise a substantially U-shaped frame including a cavity capable of receiving a slider, with the frame including two side arms and a bottom support arm at least partially defining the cavity. The bottom support arm may have a reduced mass capable of providing improved shock performance and capable of conveying a high resonance frequency response at a low gain. Generally, the center support portion shape may correspond to the bottom support arm shape.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 2a is a partial perspective view of an HGA having a conventionally designed micro-actuator;

FIG. 2b is a partial perspective view of the tongue region of the HGA of FIG. 2a;

FIG. 2c illustrates how a slider and micro-actuator conventionally are mounted to each other;

FIG. 3a is a partial perspective view of an HGA, in accordance with an example embodiment;

FIG. 3b is a detailed partial perspective view of the tongue region of the HGA of FIG. 3a, in accordance with an example embodiment;

FIG. 6 shows illustrative testing data gathered using a tilt-drop testing system and visual inspection of the medium surface for a conventional 2.5" HDD and a 2.5" HDD having a micro-actuator designed according to an example embodiment;

FIGS. 8*a-c*, 9*a-b*, and 10 each show illustrative configurations of micro-actuators, in accordance with certain example embodiments; and, FIG. 11 is a perspective view of an assembled hard disk drive, in accordance with an example embodiment.

DETAILED DESCRIPTION OF ILLUSTRATED EMBODIMENTS

Figure 1:
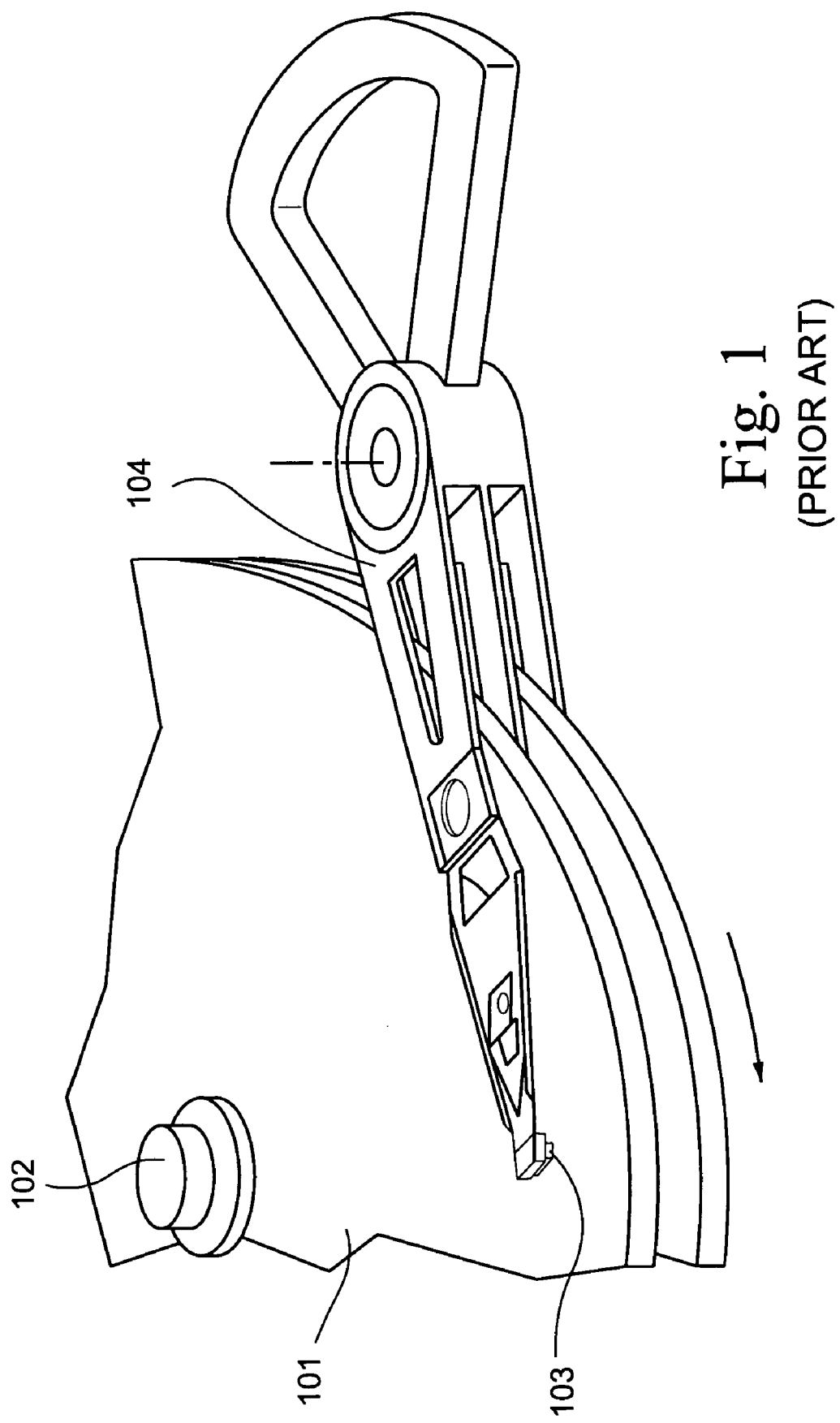
FIG. 1 is a partial perspective view of a conventional disk drive unit.

Certain example embodiments disclosed herein relate to micro-actuators, HGAs, and disk drive devices incorporating substantially U-shaped micro-actuator frames having a reduced mass. The arrangements disclosed herein may help to provide better shock performance for both small- and large-platform disk drive devices. Also, the arrangements disclosed herein may help to improve HGA dynamic performance. For example, larger mass frames tend to provide a lower resonance frequency with a higher resonance gain, whereas certain example embodiments may provide higher resonance frequencies and lower resonance gains.

FIG. 3*a* is a partial perspective view of an HGA, in accordance with an example embodiment. A suspension 330 supports a micro-actuator 301 having an associated slider 203. The suspension 330 comprises a base plate 311, a hinge 312, a flexure 310, and a load beam 314. The outer traces 306 in the flexure 310 operably couple the read/write head of the slider 203 and the pads 315. The inner traces 305 in the flexure 310 operably couple the micro-actuator 301 with the pads 315. The pads 315 are operably coupled to the control system of the HDD.

FIG. 3*b* is a detailed partial perspective view of the tongue region of the HGA of FIG. 3*a*, in accordance with an example embodiment. The micro-actuator 301 is mounted on the suspension tongue region, and a slider 203 is at least partially mounted to the micro-actuator 301. There are multiple connection balls 307 (e.g. 6 balls as shown in FIG. 3*b*, although the present invention is not limited to any particular number of connections and/or connection balls) operably coupling the slider 203 to the suspension traces 306. Additional connection balls 308 operably couple the micro-actuator 301 to the suspension traces 305.

Figure 4:
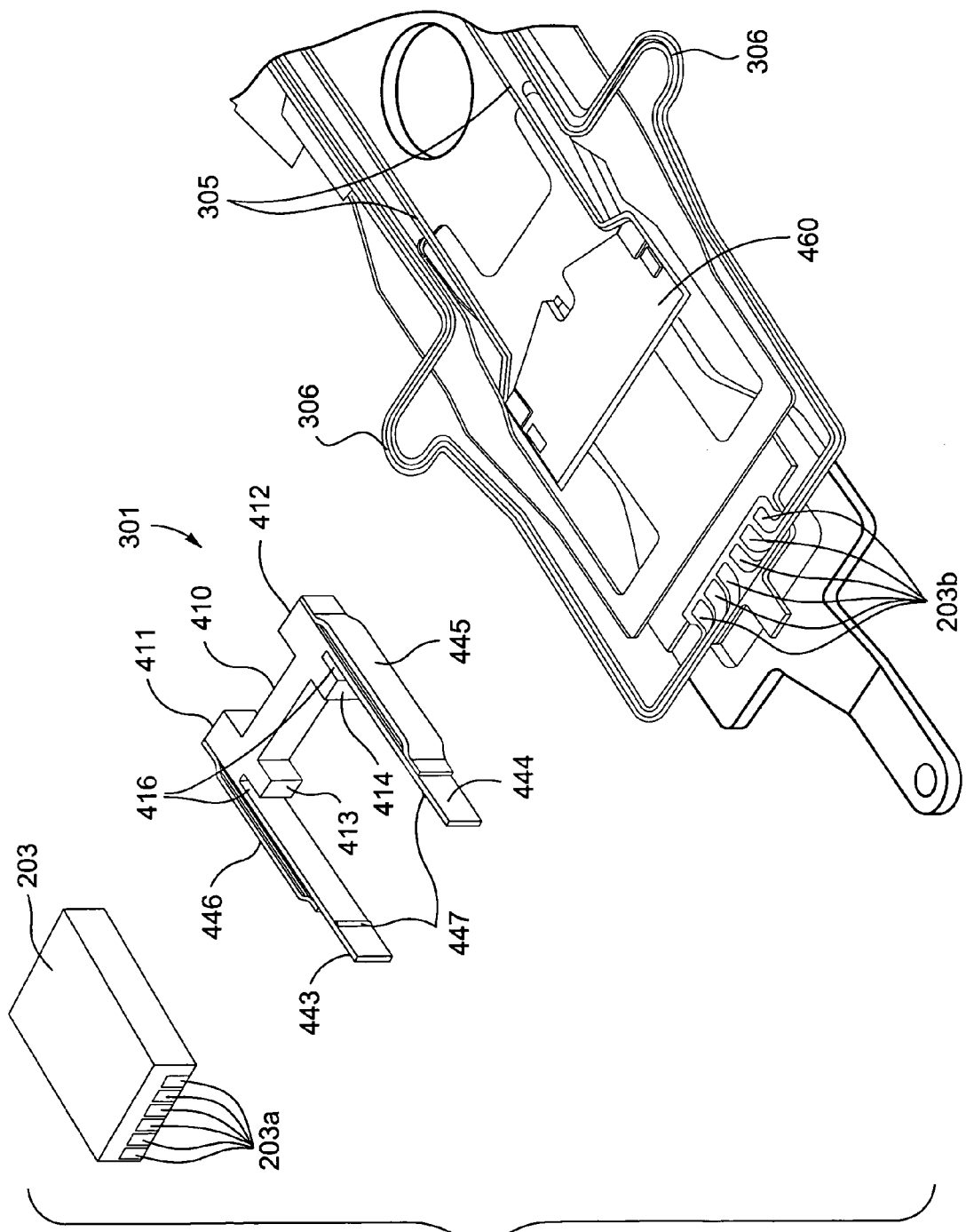
FIG. 4 is a partially exploded view of the tongue region of the HGA of FIG. 3a, in accordance with an example embodiment.

FIG. 4 is a partially exploded view of the tongue region of the HGA of FIG. 3*a*, in accordance with an example embodiment. The micro-actuator 301 comprises a bottom arm 410 and two side arms 443-444. A stopper 447 (e.g., an epoxy stopper) is located at the top of each side arm 443-444. The bottom arm 410 has two rearward-extending supports 411-412 on each side, and it also has two inward-extending supports 413-414 located on each side of the inner surface. Each inward-extending support 413-414 helps to form a notch 416 between the support 413-414 and the side arm 443-444. Each side arm 443-444 has a PZT element 445-446 located on its outer side.

The PZT element may be formed from any suitable material. For example, each PZT element may be a single crystal PZT, a multi-layer PZT, a thin-film PZT, a ceramic PZT, a PMN-Pt single crystal PZT, etc. The bottom arm 410 and the side arms 443-444 may be made from any suitable material, such as, for example, a metal, ceramic, etc.

When assembling the structure, the bottom arm 410 may be at least partially mounted on the suspension tongue 460, and the slider 203 may be at least partially mounted on the two side arms 443/444. Mounting may be accomplished using, for example, an epoxy or adhesive, although the present invention is not limited to any particular form of mounting. The pads 203*a-b* may operably couple the slider 203 to the suspension trace 306, and each PZT element may be coupled to the suspension pad at/via traces 305.

Figure 5C:
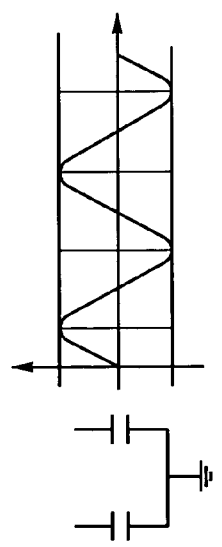
FIGS. 5c-d shows techniques for driving micro-actuators, in accordance with an example embodiment.
Figure 5D:
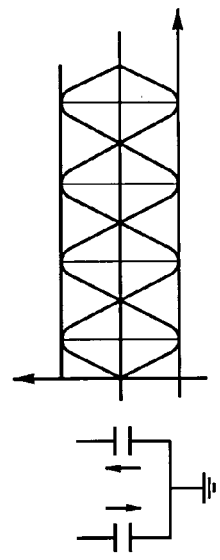
Figure 5A:
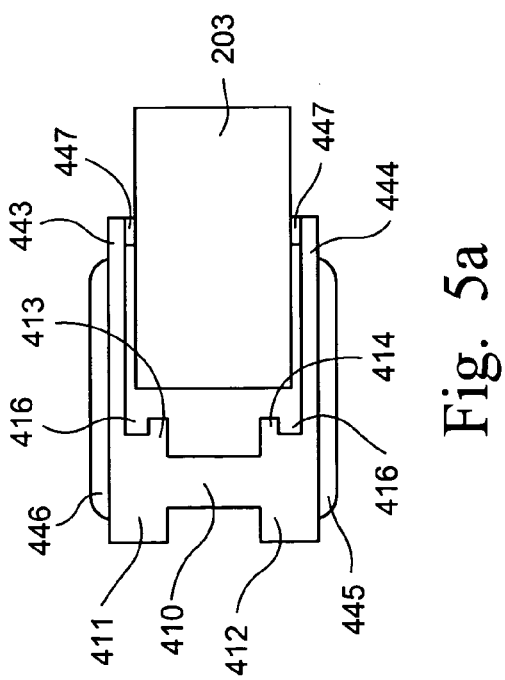
FIG. 5a shows a top view of an assembled micro-actuator, in accordance with an example embodiment.
Figure 5B:
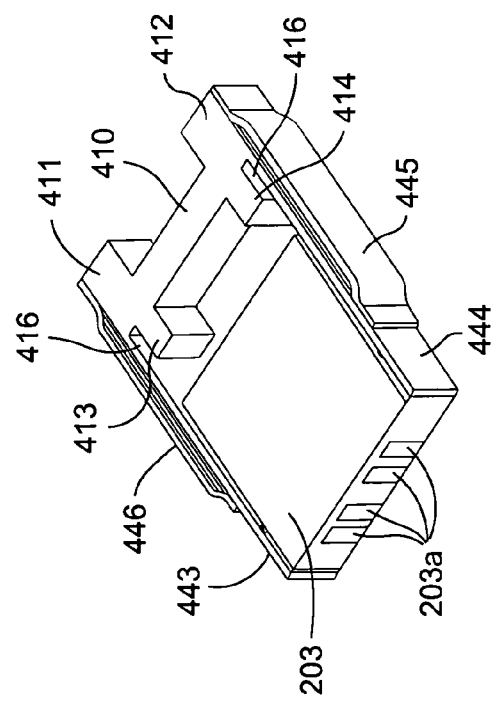
FIG. 5b shows a partial perspective view of an assembled micro-actuator, in accordance with an example embodiment.

FIG. 5*a* shows a top view of an assembled micro-actuator, in accordance with an example embodiment, and FIG. 5*b* shows a partial perspective view of an assembled micro-actuator, in accordance with an example embodiment. For these drawings, the fact that the U-shaped frame has a reduced mass becomes clear, as the bottom arm 410 has a recession formed by the rearward-extending portions 411-412, and the gaps formed by inward-extending portions 413-414 (e.g., gaps 416 and the gap between the inward-extending portions 413-414).

FIGS. 5*c-d* shows techniques for driving micro-actuators, in accordance with an example embodiment. For example, when a sine voltage is applied to the micro-actuator 301, the two side arms 443/444 of the micro-actuator 301 will bend to one side. Because the slider 203 is at least partially mounted to the two side arms 443-444, a toque will be generated, causing slider displacement. In FIG. 5*c*, a single wave is input to the circuit, whereas two sine waves having opposite phases are input (e.g., to a control circuit having opposite polarizations) in FIG. 5*d*.

FIG. 6 shows illustrative testing data gathered using a tilt-drop testing system and visual inspection of the medium surface for a conventional 2.5" HDD and a 2.5" HDD having a micro-actuator designed according to an example embodiment. In FIG. 6, an "x" indicates the presence of a dent mark on the disk surface. From the absence of dent marks of the disk surface after simulated shocks, it becomes apparent that HDDs incorporating the micro-actuators of certain example embodiments have a much better shock performance. Of course, it will be appreciated that this data represents only one set of results. In other tests, it is possible that some damage will be done to the disk surface; however, in general, the example embodiments herein having reduced mass micro-actuators will reduce the damage done to the disk surface, at least as compared to conventional techniques.

Figures 7A, 7B, 7C, 7D:
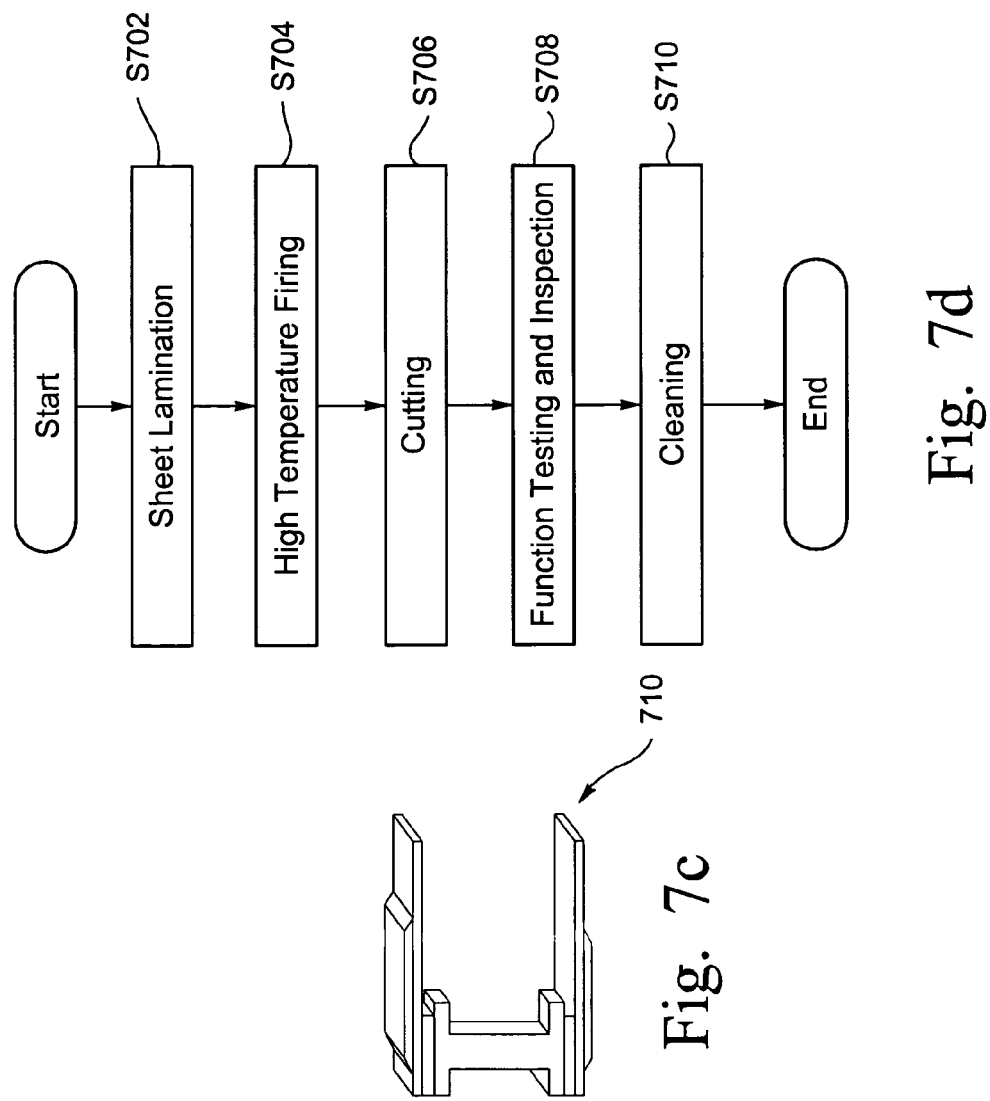
FIGS. 7a-c structurally show an illustrative process for creating micro-actuators according to certain example embodiments.
FIG. 7*d* is a flowchart of an illustrative process for creating micro-actuators, in accordance with an example embodiment.

FIGS. 7*a-c* structurally show an illustrative process for creating micro-actuators according to certain example embodiments. In particular, FIG. 7*a* is a partially exploded view illustrating one method of manufacturing an illustrative micro-actuator, in accordance with an example embodiment. PZT layers 703*a-b* may be connected (e.g., laminated) to a top and bottom sheet 701*a-b*, respectively. Spacer sheets 705*a-b* may be provided between the top and bottom sheets 701*a-b* and middle support sheets 706-708. A middle sheet 707 may be disposed between the middle support sheets 706-708. It will be appreciated that the center member formed by the connection of support sheets 706-708 to middle sheet 707 also may be provided as a single sheet, already formed with the desired dimensions.

After the connection (e.g., lamination) process is completed, the structure may be subjected to a high-temperature firing. The large U-shaped box structure of FIG. 7*b* may be cut (e.g., along the dashed lines) to form multiple, single micro-actuator units 710*a-d* of the type 710 shown in FIG. 7*c*. It will be appreciated that the dashed lines are provided by way of example and without limitation. For example, a single large U-shaped box structure may be used to produce more or fewer cuts in certain example embodiments. Also, it will be appreciated that the desired depth of the micro-actuators may vary.

FIG. 7*d* is a flowchart of an illustrative process for creating micro-actuators, in accordance with an example embodiment. Multiple sheets may be laminated in step S702 (e.g., as shown in FIG. 7*a*). The laminated structure may be subjected to a high-temperature firing in step S704. The pieces may be cut (e.g., along the lines shown in FIG. 7b) to produce multiple, single micro-actuators (e.g., of the type shown in FIG. 7c). The single micro-actuators may be subjected to function testing and inspection in step S708. Also, in step S710, the single micro-actuators may be cleaned. Finally, the single micro-actuators may be ready for use.

FIGS. 8a-c, 9a-b, and 10 each show illustrative configurations of micro-actuators, in accordance with certain example embodiments. In FIGS. 8a-c, two side arms 800a-b are provided; in FIGS. 9a-b two side arms 900a-b are provided, and in FIG. 10, two side arms 1000a-b are provided. Each side arm 800a-b, 900a-b, or 1000a-b may comprise a structure corresponding to that described above, for example, with reference to FIGS. 7a-c, although the present invention is not limited to any particular side arm configuration. Certain bottom arms are described for use with the embodiments described with reference to FIGS. 8a-c, 9a-b, and 10. The bottom arms for use with any of those embodiments may be of a thickness less than or equal to the thickness of the side arms of the particular embodiment. For example, the bottom arm 902 of FIG. 9a is the same thickness as the side arms 900a-b, while the thickness of bottom arm 802 is less than the thickness of the side arms 800a-b. It will be appreciated that although certain depths are shown in the drawings, the bottom arms of the present invention are not limited to any particular depth. Also, as noted above, the bottom arms may be formed from a single piece, or they may be formed by the connection (e.g., lamination) of multiple pieces (e.g., a piece for a center bridge member, and two pieces for each side portion, for connecting the center bridge to the side arms).

In FIG. 8a, a bottom arm 802 is provided. The bottom arm 802 may have a protrusion 804 that extends inwardly, forming recessions 806a-b between the protrusion 804 and side arms 800a-b. Also, the back of the bottom arm 802 is not flush with the rear portions of side arms 800a-b, thus forming a recession therebetween. The bottom arm 802 also may be thought of as a large substantially rectangle-shaped bridge, having notched out portions 806a-b proximate to the cavity where the slider will be inserted. The bottom arm 802 may be located near the rear of the side arms 800a-b.

In FIG. 8b, a bottom arm 808 has two side portions 810a-b for connecting it to the side arms 800a-b, respectively. A bridge portion connects the two side portions 810a-b of the bottom arm 808 such that large recessions 812a-b are formed between the side portions 810a-b. For example, the bridge may be disposed approximately in the middle of the two side portions 810a-b, although the present invention is not so limited. In the cavity for receiving the slider, the side portions 810a-b may be noted out so that recesses 816a-b are formed between the extending portions 814a-b and the side arms 800a-b, respectively. The bottom arm 808 also may be thought of as being substantially I-shaped, having notched out portions 816a-b proximate to the cavity where the slider will be inserted. The bottom arm may be located near the rear of the side arms 800a-b.

FIG. 8c is similar to FIG. 8a, except that the bottom arm 802' of FIG. 8c is shorter than the bottom arm 802 of FIG. 8a. Thus, in FIG. 8c, a larger recession is formed between side arms 800a-b, as compared to the recession between side arms 800a-b in FIG. 8a. The bottom arm 802' may be located closer to the top of the side arms 800a-b as compared to the bottom arm 800 of FIG. 8a, for example, so that the cavity for receiving the slider is substantially the same size for the micro-actuators shown in FIGS. 8a and 8c.

In FIG. 9a, a bottom arm 902 connects side arms 900a-b. The bottom arm 902 may be notched, such that a series of rearward-extending teeth 906 form a series of corresponding recessions 908. Also, the bottom arm 902 may have two protrusions 910a-b that extend inwardly to form recessions 912a-b between side arms 900a-b, respectively. The teeth 906 may be flush with the end portions of the size arms 900a-b, although the present invention is not so limited.

FIG. 9b is similar to FIG. 9a. In FIG. 9b rearward-extending teeth 906a form recessions 908a. Additionally, inward-extending teeth 908b (which are similar to rearward-extending teeth 906a) also form a series of recessions 908b. The bottom arm 902 also may be thought of as being formed from a substantially rectangle-shaped center bridge, having notches 908a-b formed in the inner and outer surfaces thereof, respectively.

In FIG. 10, a bottom arm 1002 is disposed between side arms 1000a-b. The bottom arm 1002 has two substantially triangular end portions 1004a-b for joining it to side arms 1000a-b, respectively. The triangular end portions 1004a-b help to define an outer recession 1006a between the end portions of side arms 1000a-b, and an inner recession 1006b in the cavity for receiving the slider.

It will be appreciated that certain features may be provided in various combinations. By way of example and without limitation, inward- and/or outward-extending teeth may be provided on thin bottom arms that have substantially triangle-shaped side portions, the thicknesses of the bottom arms and/or side portions thereof may vary, etc.

Figure 11:
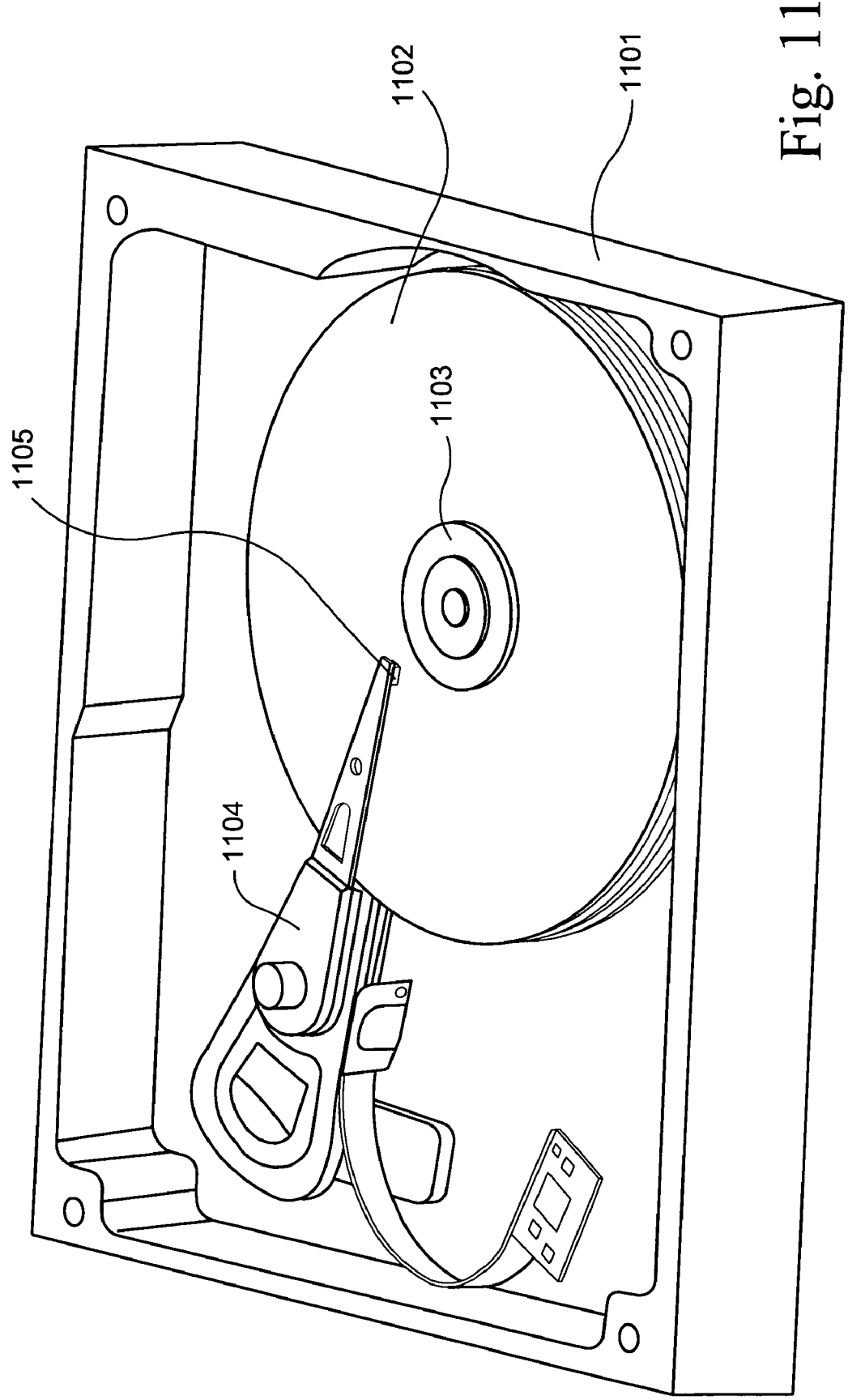

FIG. 11 is a perspective view of an assembled hard disk drive, in accordance with an example embodiment. In brief, the HDD includes a frame 1101. One or more disks 1102 are spun by a spindle motor 1003. A VCM 1104 controls the slider 1105 that flies over the disk 1102. The slider 1105 may be inserted into a micro-actuator frame (not shown), designed in accordance with any example embodiment disclosed herein (e.g., a micro-actuator frame corresponding to the structure depicted in and/or suggested by one or more of FIGS. 8a-c, FIG. 9a-b, FIG. 10, or a combination thereof). One of ordinary skill in the art will clearly understand the operation of the HDD of FIG. 11, and further details are omitted to avoid confusion.

It will be appreciated that although certain example embodiments are described with reference to small platform hard disk drives, the present invention is not so limited. The techniques disclosed herein have general applicability to any kind disk drive device, regardless of, for example, platform size. Also, the techniques disclosed herein may be applied to micro-actuators having single PZT elements.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A micro-actuator, comprising:
   a substantially U-shaped frame including a cavity capable of receiving a slider, the frame including two side arms and a bottom support arm at least partially defining the cavity;
   wherein each side arm has a PZT element mounted on an outer surface thereof facing away from the cavity; and,
   wherein the bottom support arm is substantially rectangle-shaped and has at least one cavity-facing tooth extending from a first side of the bottom support arm facing towards the cavity, the at least one cavity-facing tooth at least partially forming at least one cavity-facing protrusion and at least partially defining at least one cavity-facing recession, wherein the bottom support arm has at least one rear-facing tooth extending from a second side of the bottom support arm facing away from the cavity, the at least one rear-facing tooth at least partially forming at least one rear-facing protrusion and at least partially defining at least one rear recession, and wherein the bottom support arm is capable of providing improved shock performance and capable of conveying a high resonance frequency response at a low gain.

2. The micro-actuator of claim 1, wherein the bottom support arm has a first thickness, and the side arms have a second thickness, the first thickness being less than the second thickness.

3. The micro-actuator of claim 1, wherein the side arms have first ends and second ends, the first ends at least partially defining the cavity, and wherein the bottom support arm is disposed between the side arms such that the bottom support arm is recessed relative to the second ends of the side arms.

4. The micro-actuator of claim 1, wherein the bottom support arm is substantially rectangle-shaped and has two notches proximate to the side arms at least partially defining a protrusion and two recessions, the protrusion protruding into the cavity.

5. The micro-actuator of claim 1, wherein the bottom support arm is substantially rectangle-shaped and has two cavity-facing protrusions extending from a first side of the bottom support arm facing towards the cavity, the cavity-facing protrusions at least partially forming two cavity-facing protrusion and at least partially defining one cavity-facing recession, each cavity-facing protrusion being disposed proximate to a side arm; and, wherein the bottom support arm has at least one rear-facing tooth extending from a second side of the bottom support arm facing away from the cavity, the at least one rear-facing tooth at least partially forming at least one rear-facing protrusion and at least partially defining at least one rear recession.

6. A head gimbal assembly, comprising:

a suspension configured to support on a tongue region thereof a micro-actuator and a slider, the suspension comprising a load beam supporting a base plate and a hinge;

wherein the micro-actuator comprises a substantially U-shaped frame including a cavity capable of receiving the slider, the frame including two side arms and a bottom support arm at least partially defining the cavity, wherein each side arm has a PZT element mounted on an outer surface thereof facing away from the cavity; and, wherein the bottom support arm is substantially rectangle-shaped and has at least one cavity-facing tooth extending from a first side of the bottom support arm facing towards the cavity, the at least one cavity-facing tooth at least partially forming at least one cavity-facing protrusion and at least partially defining at least one cavity-facing recession, wherein the bottom support arm has at least one rear-facing tooth extending from a second side of the bottom support arm facing away from the cavity, the at least one rear-facing tooth at least partially forming at least one rear-facing protrusion and at least partially defining at least one rear recession, and wherein the bottom support arm is capable of providing improved shock performance and capable of conveying a high resonance frequency response at a low gain.

7. The head gimbal assembly of claim 6, wherein the bottom support arm is substantially rectangle-shaped and has two notches proximate to the side arms at least partially defining a protrusion and two recessions, the protrusion protruding into the cavity.

8. The head gimbal assembly of claim 6, wherein the bottom support arm is substantially rectangle-shaped and has two cavity-facing protrusions extending from a first side of the bottom support arm facing towards the cavity, the cavity-facing protrusions at least partially forming two cavity-facing protrusion and at least partially defining one cavity-facing recession, each cavity-facing protrusion being disposed proximate to a side arm; and, wherein the bottom support arm has at least one rear-facing tooth extending from a second side of the bottom support arm facing away from the cavity, the at least one rear-facing tooth at least partially forming at least one rear-facing protrusion and at least partially defining at least one rear recession.

9. A disk drive device, comprising:

a head gimbal assembly carrying a micro-actuator and a slider;

a drive arm connected to the head gimbal assembly;

a disk; and, a spindle motor operable to spin the disk;

wherein the micro-actuator comprises a substantially U-shaped frame including a cavity capable of receiving the slider, the frame including two side arms and a bottom support arm at least partially defining the cavity, wherein each side arm has a PZT element mounted on an outer surface thereof facing away from the cavity; and, wherein the bottom support arm is substantially rectangle-shaped and has at least one cavity-facing tooth extending from a first side of the bottom support arm facing towards the cavity, the at least one cavity-facing tooth at least partially forming at least one cavity-facing, protrusion and at least partially defining at least one cavity-facing recession, wherein the bottom support arm has at least one rear-facing tooth extending from a second side of the bottom support arm facing away from the cavity, the at least one rear-facing tooth at least partially forming at least one rear-facing protrusion and at least partially defining at least one rear recession. and wherein the bottom support arm is capable of providing improved shock performance and capable of conveying a high resonance frequency response at a low gain.

10. The disk drive device of claim 9, wherein the bottom support arm is substantially rectangle-shaped and has two notches proximate to the side arms at least partially defining a protrusion and two recessions, the protrusion protruding into the cavity.

11. The disk drive device of claim 9, wherein the bottom support arm is substantially rectangle-shaped and has two cavity-facing protrusions extending from a first side of the bottom support arm facing towards the cavity, the cavity-facing protrusions at least partially forming two cavity-facing protrusion and at least partially defining one cavity-facing recession, each cavity-facing protrusion being disposed proximate to a side arm; and, wherein the bottom support arm has at least one rear-facing tooth extending from a second side of the bottom support arm facing away from the cavity, the at least one rear-facing tooth at least partially forming at least one rear-facing protrusion and at least partially defining at least one rear recession.

12. A method of making a micro-actuator, comprising:

connecting two side portions around a center support portion and connecting a PZT element to an outer side of each side portion to form a large structure;

exposing the large structure to high-temperature firing; and, cutting the large structure into at least one micro-actuator, wherein the at least one micro-actuator comprises a substantially U-shaped frame including a cavity capable of receiving a slider, the frame including two side arms and a bottom support arm at least partially defining the cavity, wherein the bottom support arm is substantially rectangle-shaped and has at least one cavity-facing tooth extending from a first side of the bottom support arm facing towards the cavity, the at least one cavity-facing tooth at least partially forming at least one cavity-facing protrusion and at least partially defining at least one cavity-facing recession, wherein the bottom support arm has at least one rear-facing tooth extending from a second side of the bottom support arm facing away from the cavity, the at least one rear-facing tooth at least partially forming at least one rear-facing protrusion and at least partially defining at least one rear recession, and wherein the bottom support arm is capable of providing improved shock performance and capable of conveying a high resonance frequency response at a low gain;

wherein the center support portion shape corresponds to the bottom support arm shape.

13. The method of claim 12, further comprising disposing two spacer portions between the side portions and the center support portion.

14. The method of claim 12, further comprising cleaning the at least one micro-actuator and/or the large structure.

15. The method of claim 12, wherein the center support portion is substantially rectangle shaped.

16. The method of clam 12, further comprising at least partially mounting the at least one micro-actuator onto a head gimbal assembly.

17. The method of claim 16, further comprising installing the head gimbal assembly into a disk drive device.

* * * * *